(12) United States Patent
Majax

(10) Patent No.: US 6,609,802 B1
(45) Date of Patent: Aug. 26, 2003

(54) OPTICAL INSTRUMENT WITH UPWARD VIEWING IN A HORIZONTAL MIRROR

(76) Inventor: Gérard Majax, 130, rue Clignancourt, F-75018, Paris (FR)

( * ) Notice: Subject to any disclaimer, the term of this patent is extended or adjusted under 35 U.S.C. 154(b) by 0 days.

(21) Appl. No.: 09/856,558

(22) PCT Filed: Oct. 12, 1999

(86) PCT No.: PCT/FR99/02454
§ 371 (c)(1),
(2), (4) Date: Aug. 6, 2001

(87) PCT Pub. No.: WO01/22145
PCT Pub. Date: Mar. 29, 2001

(30) Foreign Application Priority Data

Sep. 23, 1999 (FR) .......................................... 99 11869

(51) Int. Cl.$^7$ .............................................. G02B 7/182
(52) U.S. Cl. ..................... 359/879; 359/880; 359/871; 359/872
(58) Field of Search ................. 359/879, 880, 359/871, 872, 881, 478, 479, 480, 481, 482

(56) References Cited

U.S. PATENT DOCUMENTS

| | | | | |
|---|---|---|---|---|
| 5,148,327 A | * | 9/1992 | Gaxiola, Jr. ............... | 359/855 |
| 5,408,713 A | * | 4/1995 | Stratton et al. ............. | 5/632 |
| 5,572,229 A | * | 11/1996 | Fisher ....................... | 345/8 |
| 6,010,225 A | * | 1/2000 | Lerner et al. ............... | 359/872 |
| 6,211,903 B1 | * | 4/2001 | Bullister .................... | 348/14.16 |
| 6,386,706 B1 | * | 5/2002 | McClure et al. ............. | 351/237 |

* cited by examiner

*Primary Examiner*—Mohammad Sikder
(74) *Attorney, Agent, or Firm*—Connolly Bove Lodge & Hutz LLP

(57) ABSTRACT

The invention concerns an optical device for producing a visual illusion by holding a mirror under a user's eyes. More particularly, the invention concerns a device for fixing on a user's head a horizontal support comprising a mirror and located just below his eyes. It consists of a support on which is fixed a mirror. Two perpendicular stop elements, resing on the user's cheeks, maintain the horizontal support. Two linknig branches with fixing straps are attached with the fixing straps to the branches so as to press one against the other above the user's head, thereby enabling adjustment of theheight of the device. Two fixing straps are attached to the branches to press one against the other behind the user's head so as to keep the whole device pressed against the user's face.

8 Claims, 1 Drawing Sheet

OPTICAL INSTRUMENT WITH UPWARD VIEWING IN A HORIZONTAL MIRROR

FIELD OF THE INVENTION

This invention relates to an optical instrument designed to hold a mirror horizontally at a user's eye level. Maintaining the mirror at this level allows the user to see the ceiling in said mirror as if it were the ground.

BRIEF DESCRIPTION OF THE INVENTION

The device as set forth in the invention makes it possible to maintain the mirror horizontally. Indeed it consists of a first characteristic: a support with two perpendicular stops that rest on the user's cheeks.

According to specific methods of execution: -Two magnetized anchor bands that pass over the user's head making it possible to adjust the height of the device.

Two magnetized anchor bands that pass behind the user's head, making it possible to hold the device against one's face.

DETAILED DESCRIPTION OF THE INVENTION

Figure 1:
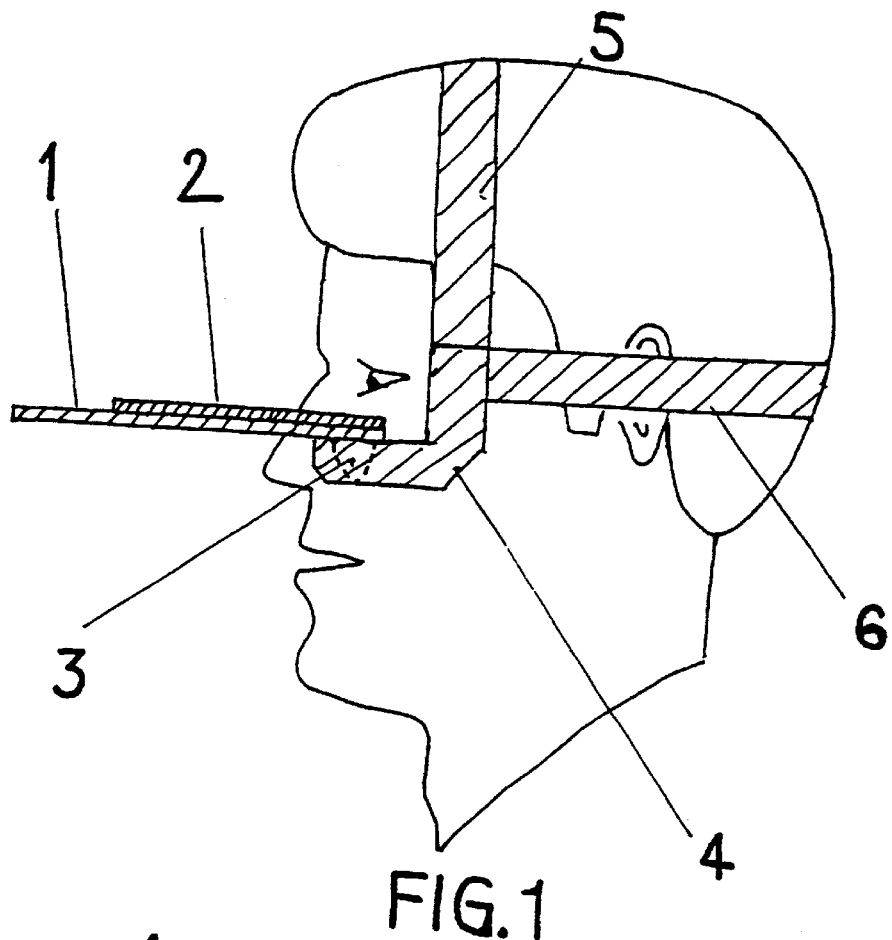
FIG. 1 represents a sectional side view of the invention's device in place on a user's head.
Figure 2:
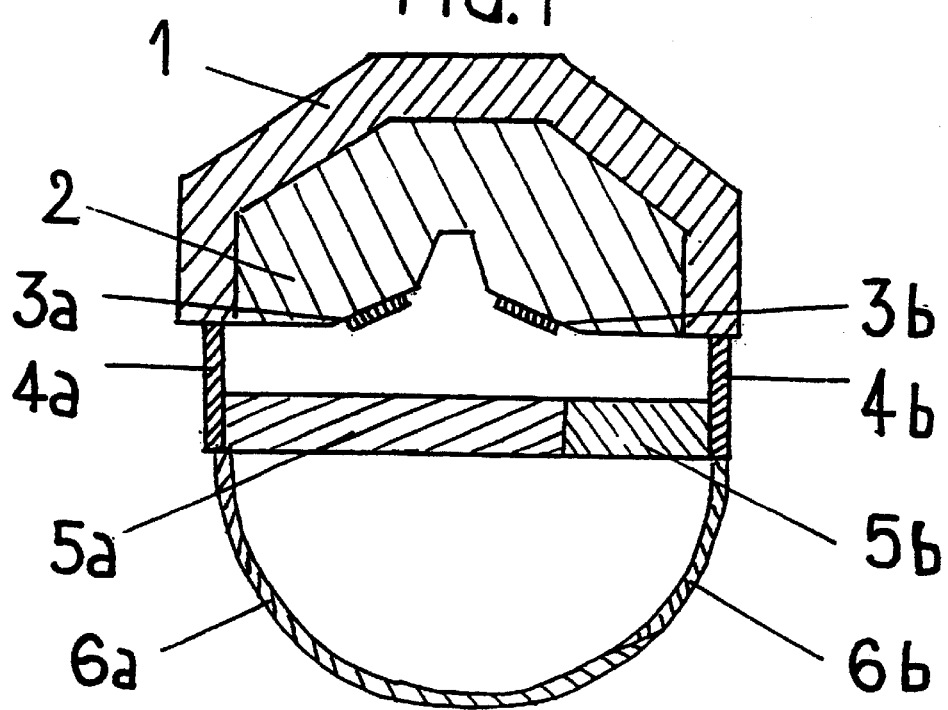
FIG. 2 represents a sectional view from above of the invention's device.

In reference to these drawings, the device is comprised of a plastic support (1) cut out to fit the average shape of the nose and cheeks of potential users (visible in FIG. 2).

A mirror (2) made of unbreakable material is glued on the support. Its shape matches that of the support (visible in FIG. 2).

Two plastic perpendicular stops (3a and 3b) are attached under the sides of the support so that they rest on the cheeks of the user and allow the mirror to remain horizontal.

Two attachment temples (4a and 4b) made of plastic are attached under the sides of the mirror's support in order to connect them with the fastening straps (5 and 6).

The two fastening straps (5a and 5b) are made of magnetized plastic. Therefore all you need to do is to put one on top of the other to fasten them on the user's head at the desired size and thus adjust the height of the device so that the mirror is located under the user's eyes. The two fastening straps (6a and 6b) while remaining flexible are made of magnetized plastic. Attached behind the user's head, they make it possible to keep the device up against the user's face.

As a non-restrictive example, the support's dimensions will be in the range of 18 cm for the width and 11 cm for the depth. The mirror: 15 cm/7 cm.

The object of the invention: The device as set forth in the invention is in particular designed to reflect the ceiling under the user's eyes so that the latter will have the illusion of walking on said ceiling.

The first application is a recreational course for an amusement park, a museum or a fair. A course with two ramps allows the user to walk on a horizontal and stable floor while having the illusion of walking on the recreational setting of the ceiling.

The second application is more industrial with the manufacture and sale of simple models of this device as a group game that can be played with family or friends, where each person is amused by the user's amazement in discovering the surprises installed in the ceiling as magical barriers, based on the course over which he is guided.

What is claimed is:

1. Device intended to create an optical illusion, comprising:

a mirror held horizontally under a user's eyes, means for attaching the mirror in such a way that, by reflection from the mirror, the user sees a ceiling, giving the user the illusion of walking on it, as if it were the floor.

2. Device as set forth in claim 1, wherein the means of attaching comprises straps making it possible to adjust the height of said device and hold it against the user's face.

3. Device as set forth in claim 1, wherein the attaching means comprises: two straps of desired dimensions, fastened on the user's head, making it possible to adjust the height of the device, and two straps, fastened behind the user's head, making it possible to hold the device up against the user's face.

4. Device as set forth in claim 3, wherein the four straps are made of magnetized plastic.

5. Device as set forth in claim 2, wherein the mirror is glued on a horizontal support of matching shape, under the sides of which are also attached two attachment temples made of plastic, making possible a connection with the straps ensuring the device will be held in place.

6. Device as set forth in claim 5, wherein the support includes two perpendicular stops that rest on the user's cheeks.

7. Device as set forth in claim 5, wherein the support is made of plastic and is cut out to match the average shape of a user's nose and cheeks.

8. Device as set forth in claim 1 together with at least one ramp for guiding a user, and allowing the user to walk on a stable and horizontal floor, while having the illusion of walking on the ceiling, and discovering surprises that have been installed thereon as magical barriers.

* * * * *